United States Patent

Mizutani et al.

[11] 4,138,086
[45] Feb. 6, 1979

[54] MOLD FOR MANUFACTURING CONTACT LENSES

[75] Inventors: Yutaka Mizutani, Nagoya; Yoshiharu Miwa, Gifu; Mitsuru Oshima, Obu, all of Japan

[73] Assignee: Nippon Contact Lens Manufacturing Ltd., Nagoya, Japan

[21] Appl. No.: 808,857

[22] Filed: Jun. 22, 1977

[30] Foreign Application Priority Data

Apr. 28, 1977 [JP] Japan .................................. 52-48397

[51] Int. Cl.² .............................................. B29D 11/00
[52] U.S. Cl. ..................... 249/116; 249/135; 425/806; 425/808; 425/DIG. 58
[58] Field of Search ..................... 264/1; 425/806, 808, 425/DIG. 58; 249/116, 135

[56] References Cited

U.S. PATENT DOCUMENTS

| 285,058 | 9/1883 | Nickerson | 249/135 |
|---|---|---|---|
| 2,292,917 | 8/1942 | Williams | 264/1 |
| 3,166,796 | 1/1965 | Wehinger | 249/135 |
| 3,915,609 | 10/1975 | Robinson | 425/808 |

FOREIGN PATENT DOCUMENTS 2356911  5/1975  Fed. Rep. of Germany .............. 264/1

*Primary Examiner*—Robert L. Spicer, Jr.
*Assistant Examiner*—John McQuade
*Attorney, Agent, or Firm*—Frank J. Jordan

[57] ABSTRACT

A mold for manufacturing silicone contact lenses is provided. The mold comprises a male section and a female section plated with chromium or nickel which when joined together come into contact with each other only at a portion at which the mold surface of one section becomes continuous with that of the other section to define a cavity therebetween. The contact between both sections is not in a flat-to-flat fashion but in a line or edge-to-edge fashion so that a contact lens whose surface and edge are completely freed from flashes or irregularities can be obtained. Further, with the use of chromium or nickel plated mold of the present invention, a contact lens of excellent quality can be obtained from a silicone resin which is affinitive to chromium and nickel.

7 Claims, 4 Drawing Figures

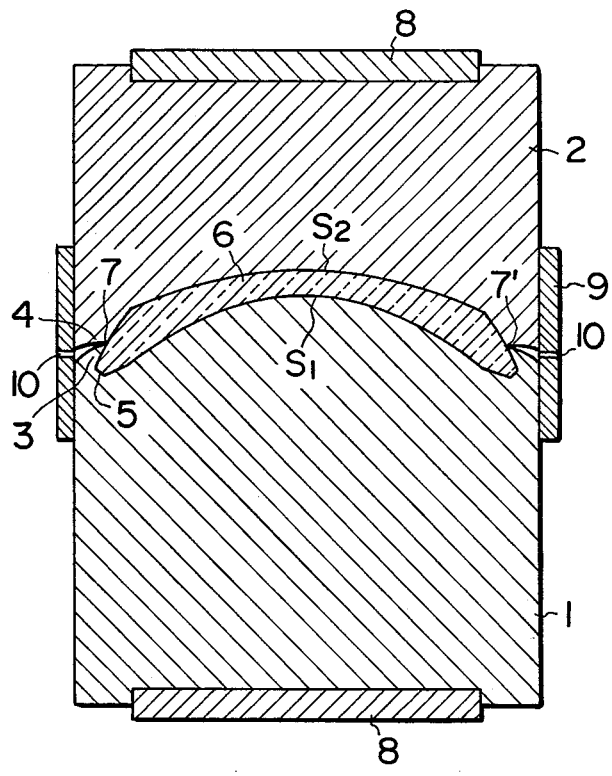
FIG. 1
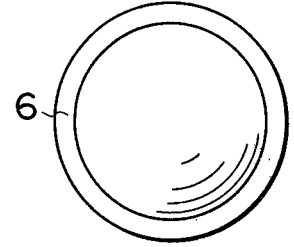
FIG. 3 (a)
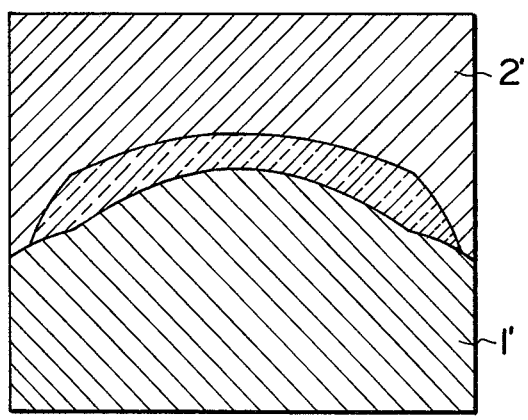
Prior Art  FIG. 2
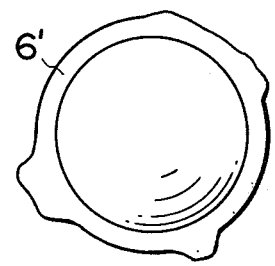
FIG. 3 Prior Art (b)

MOLD FOR MANUFACTURING CONTACT LENSES

FIELD OF INVENTION

The present invention relates to a mold for manufacturing silicone contact lenses and, more particularly, to a mold of the type comprising a pair of mold halves which when joined together form a cavity therebetween into which is cast a flowable contact lens material.

DESCRIPTION OF PRIOR ART

The conventional contact lens has been manufactured in such a manner that a roughly shaped contact lens of a comparatively hard material such as polymethacrylate is cut and ground to a finished lens and, therefore, no mold has been needed for its manufacture. Further, it has been considered difficult to use a mold for lens manufacturing purposes since the polymethacrylate contracts to a great degree when it is molded. For these and other reasons, no satisfactory mold has ever been developed in the field of contact lens manufacture. However, it has been found of late that the so called hard contact lens which is made of hard material like polymethyle methacrylate has such drawbacks that when in use it irritates the eye of a patient and moreover, due to its poor oxygen permeability, the continual use thereof is almost impossible. To overcome these disadvantages, a contact lens of silicone resin which is rich in flexibility and excellent in oxygen permeability has been proposed. However, the lens of this type is too soft to cut or grind in its hard refrigerated state in vain because it again becomes soft due to a rise in temperature as a result of friction during processing. Further, the characteristics of the silicone resin vary between a state in which it is hard and a state in which it is soft, so that it has not been possible to manufacture from this material a wearable contact lens to a patient's satisfaction. Although the U.S. Patents issued to H. D. Condon, Pat. No. 3,221,083 issued Nov. 20, 1965 and C. C. Robinson, U.S. Pat. No. 3,915,609 issued Oct. 28, 1975, respectively, disclose molds of the type similar to that of the present invention, these molds can not more or less escape the above mentioned disadvantages in that the mold of Condon's patent is apparently so simply formed that a contact lens produced thereby must be subjected to further steps of processing such as cutting and grinding while Robinson's patent, which shows some improvements over the former, is rather directed to a mold construction suitable for radiation of a high energy electron beam.

The present invention has been made to overcome the above mentioned disadvantages of the conventional contact lens and to provide a mold capable of producing a silicone contact lens of excellent quality in its final and finished form in a simple manner.

SUMMARY OF INVENTION

The mold according to the present invention comprises a pair of metallic mold halves, a male section and a female section. The male section has on its upper side a convex mold surface for forming the posterior surface of a lens and a peripheral portion in the shape of a tapered protrusion with a sharp edge extending above the edge of the convex mold surface and the female section has on its lower side a concave mold surface for forming the anterior surface of the lens and a curved peripheral portion surrounding the former.

With such an arrangement, one of the important features of the present invention resides in that both male and female sections of the mold can be joined together such that the tapered edge of the periperal portion of the former comes into contact with the edge of the concave mold surface of the latter in a line or edge-to-edge fashion to thereby provide a mold cavity therebetween so that the surface and the edge of the lens produced thereby can be prevented from becoming irregularly or ruggedly formed as was often the case with the conventional contact lens and, therefore, a finished contact lens per se can be manufactured without requiring further steps of cutting and grinding.

Another important feature of the present invention resides in that the mold surface of each section is plated with chromium or nickel so that a contact lens having high surface optical quality can be manufactured, especially with the use of a silicone resin as a material therefor which has a strong affinity for chromium and nickel.

Accordingly, an object of the present invention is to provide a mold for manufacturing silicone contact lenses in their final form without applying further steps of processing thereon such as cutting and grinding.

Another object of the present invention is to provide a mold of the above character which can be manufactured in a simple manner and at low cost and which can be used semi-permanently.

BRIEF EXPLANATION OF DRAWING

The present invention will be explained in detail hereunder with reference to the accompanying drawing in which:

FIG. 1 is a vertical sectional view of a mold for manufacturing silicone contact lenses according to the present invention;

FIG. 2 is a vertical sectional view of a conventional mold for manufacturing contact lenses;

FIG. 3(a) is a plane view of a contact lens manufactured by use of the mold according to the present invention as shown in FIG. 1; and FIG. 3(b) is a plane view of a contact lens manufactured by use of the conventional mold as shown in FIG. 2.

DETAILED DESCRIPTION OF INVENTION

As shown in FIG. 1, a preferred embodiment of the mold according to the present invention comprises a pair of mold halves, that is, a male section 1 and a female section 2 both of which is made of a metallic material preferably of brass. Further, the male section 1 is provided on its upper side with a central convex mold surface $S_1$ for forming the posterior surface of a lens 6 and a peripheral portion 3 in the shape of a tapered protrusion with a sharp edge extending above the entire edge of the surface $S_1$. As will be clear from the drawing, the internal surface of the peripheral portion 3, which is continuous with the surface $S_1$, constitutes itself a mold surface for forming in part the anterior surface of the lens 6 when both sections 1 and 2 are joined together. On the contrary, the female section 2 is provided on its lower side a central concave mold surface $S_2$ for forming the anterior surface of the lens in cooperation with the peripheral portion 3 of the male section 1 and a curved peripheral portion 4 surrounding the former. Further, the surfaces $S_1$ and $S_2$ with the inclusion of the internal surface of the portion 3 of the section 1 are plated with chromium, preferably hard chromium, or nickel which is closely related to the silicone resin used in the present invention.

With the above arrangement, when both sections 1 and 2 are joined together, the edge of the peripheral portion 3 of the former comes into contact with the edge of the surface $S_2$ of the latter as at 7 and/or 7' not in a flat-to-flat fashion as shown in FIG. 2 (which shows a typical conventional mold structure) but in a line or edge-to-edge fashion as shown in FIG. 1. This manner of contact has a particular advantage in that a melting lens material flowing outside the mold through a fine gap between the opposing contact surfaces of both sections is cut easily and cleanly without forming any flash extending outside the mold cavity from the lens edge since the contact area between both sections is kept at minimum, and with a mold of such structure only, the steps of cutting and grinding for the lens can be dispensed with. For example, FIG. 3(a) shows an example of a lens manufactured by the mold according to the present invention while FIG. 3(b) shows that of a lens manufactured by the conventional mold as shown in FIG. 2. Further, it will be more preferable in this case that, as shown in FIG. 1, the edge of the mold cavity which corresponds to the edge 5 of the lens is rounded in the male section and the contact portion 7 and/or 7' comes to lie above, and in the vicinity of, the edge of the mold so that the lens edge corresponds thereto can be preformed and the contact lens as well as the mold can be manufactured more easily and simply than otherwise in view of the fact that the contact lens has extremely a minute structure with the radius of curvature at the lens edge 5 being as small as 0.13 mm and the wearing conditions of the lens do depend much on the conditions of finish thereat.

In FIG. 1, a numeral 8 indicates a hard metallic plate half embedded in each of the sections 1 and 2 which plate is provided to prevent the mold from deformation or damage when a mechanical force is applied on the mold to press same. A support 9 provided around the side wall of the mold is adopted to cause the center of the anterior surface of the lens 6 to coincide with that of the posterior surface thereof in a simple manner the failure of which would make the lens useless. A hole 10 formed in the support 9 is adopted to pull out air from the mold cavity. By the way, as regards the manner of contact between both male and female sections 1 and 2 of the mold according to the present invention should not be construed so strictly as above described and, therefore, a slight degree of flatness in their contact should also be considered included in the scope of the present invention provided that no rugged or irregular formation of the lens surface and edge takes place.

The following Table 1 shows how the efficiency of a contact lens varies in dependence on the kinds of platings on the surface of a mold by which the contact lens is shaped, especially between the platings of chromium or nickel and other materials.

Table 1

| Characteristics Kinds of Platings | Conditions of Surface Finish | Easiness of Grinding | Resistance to Shocks due to Falling | Resistance to Damages due to Scratches | Resistance to Friction | Resistance to Heat | Resistance to Corrosion by Organic Solvents | Durability | Ease of Difficulty in Target Test by Gauge | Optical Property of Lens Surface | Separability from Mold Surface | Sharpness at Lens Periphery |
|---|---|---|---|---|---|---|---|---|---|---|---|---|
| No Plating | A | | D | D | D | D | D | D | | B | A | A |
| Hard Chromium | B | A | A | A | A | A | A | A | A | A | A | A |
| Nickel | A | B | C | C | A | A | A | B | B | A | A | A |
| Copper | C | D | D | D | C | C | D | D | D | B | A | B |
| Zinc | D | D | D | D | D | B | D | D | D | C | B | B |
| Tin | D | D | D | D | D | D | D | D | D | D | D | D |
| Iron | C | C | C | C | B | B | C | C | C | B | B | C |

Remarks. The markings A, B, C, and D as given in the above table indicate "best", "fair", "bad", and "worst", respectively.

From the above Table 1, it will be seen that a mold plated with hard chrmium and a contact lens made of a silicone resin have excellent characteristics and especially the optical property of the surface of the silicone contact lens gives a great effect upon its efficiency and that a silicone contact lens manufactured by a hard chromium or nickel plated mold is excellent since it appears that there is a strong affinity or a favorable relationship between a silicone resin and chromium and nickel.

As described above, it will be seen that the mold for manufacturing silicone contact lenses according to the present invention makes it possible to manufacture completely finished silicone contact lenses on a large scale and in a simple manner without the necessity of applying any additional steps thereto such as cutting and grinding and has a great industrial merit in that the mold can be manufactured in a simple manner and can be used semipermanently.

What is claimed is:

1. A mold for manufacturing a silicone contact lens characterized in that the mold comprises a male section having a convex mold surface and a female section having a concave mold surface to thereby define a mold cavity therebetween, said convex and concave mold surfaces being plated with a metal selected from the group consisting of chromium, hard chromium and nickel, the edge of said male section adjacent said convex mold surface turning upwardly and inwardly toward said concave mold surface of said female section so as to have a configuration suitable for forming the edge of the lens, said male section and said female section, when joined together, coming into edge-to-edge contact with each other only at a portion of the mold cavity lying above and adjacent the edge outer of said mold cavity.

2. A mold according to claim 1, in which said convex mold surface of the male section and said concave mold surface of the female section are plated with chromium.

3. A mold according to claim 1, in which said convex mold surface of the male section and said concave mold surface of the female section are plated with nickel.

4. A mold according to claim 1, in which said convex mold surface of the male section and said concave mold surface of the female section are plated with hard chromium.

5. A mold for manufacturing a silicone contact lens comprising a male mold section having a convex mold surface and a female mold section having a concave mold surface, said convex and concave mold surfaces being plated with a metal selected from the group consisting of chromium and nickel, said male mold section having a radial outer portion circumscribing said convex mold surface, said radial outer portion having a concave cross-sectional configuration such that the peripheral edge of the lens is molded in said radial outer concave portion, said radial outer concave portion terminating in a first circumscribing edge, said female mold section having a radial outer surface which joins said concave mold surface along a second circumscribing edge, said first and second circumscribing edges on said male and female mold sections mating with one another with line contact, whereby formation of irregularities on the lens at the line of contact between the male and female mold sections is precluded.

6. A mold according to claim 5, wherein said male and female mold sections are separable and mateable along a longitudinal axis, said first circumscribing edge of said first circumscribing edge of said male mold section being disposed radially inwardly of the peripheral edge of the lens formed in the radial outer concave portion.

7. A mold according to claim 5, wherein said radial outer concave portion of said male mold section has an upper outer radial surface disposed radially outwardly of said first circumscribing edge, said upper outer radial surface being spaced from said radial outer surface on said female mold section.

* * * * *